United States Patent
Lyu et al.

(10) Patent No.: US 7,899,859 B2
(45) Date of Patent: Mar. 1, 2011

(54) EFFICIENT ERROR-CHECK AND EXACT-CHECK FOR NEWTON-RAPHSON DIVIDE AND SQUARE-ROOT OPERATIONS

(75) Inventors: Allen Lyu, Saratoga, CA (US); Leonard D. Rarick, Los Altos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1470 days.

(21) Appl. No.: 11/314,639

(22) Filed: Dec. 20, 2005

(65) Prior Publication Data

US 2007/0143389 A1    Jun. 21, 2007

(51) Int. Cl.
    G06F 7/38    (2006.01)
(52) U.S. Cl. .................. 708/502; 708/510; 708/605; 708/654
(58) Field of Classification Search .......... 708/502, 708/510, 605, 654
See application file for complete search history.

(56) References Cited

U.S. PATENT DOCUMENTS

| | | | | |
|---|---|---|---|---|
| 5,563,818 A | * | 10/1996 | Agarwal et al. | 708/400 |
| 5,956,263 A | * | 9/1999 | Narita et al. | 708/525 |
| 6,115,733 A | * | 9/2000 | Oberman et al. | 708/654 |
| 6,941,334 B2 | * | 9/2005 | Rogenmoser et al. | 708/502 |
| 2002/0198918 A1 | * | 12/2002 | Steele, Jr. | 708/497 |

* cited by examiner

*Primary Examiner* — Chuong D Ngo
(74) *Attorney, Agent, or Firm* — Park, Vaughan, Fleming & Dowler LLP

(57) ABSTRACT

One embodiment of the present invention provides a system that performs both error-check and exact-check operations for a Newton-Raphson divide or square-root computation. During operation, the system performs Newton-Raphson iterations followed by a multiply for a divide or a square-root operation to produce a result, which includes one or more additional bits of accuracy beyond a desired accuracy for the result. Next, the system rounds the result to the desired accuracy to produce a rounded result t. The system then analyzes the additional bits of accuracy to determine whether t is correct and whether t is exact.

21 Claims, 4 Drawing Sheets

Some examples for rounding to nearest, k=4

EFFICIENT ERROR-CHECK AND EXACT-CHECK FOR NEWTON-RAPHSON DIVIDE AND SQUARE-ROOT OPERATIONS

BACKGROUND

1. Field of the Invention

The present invention relates to circuits that perform arithmetic operations. More specifically, the present invention relates to a method and an apparatus that efficiently performs error-check and exact-check operations for Newton-Raphson divide and square-root operations.

2. Related Art

Several techniques can be used to perform divide, a/b, and square-root, $\sqrt{b}$, operations. One popular technique is to use the Newton (sometimes called the Newton-Raphson) method. As typically implemented for the division operation, the Newton-Raphson method first finds an approximation to a zero of the function $$f(x) = 1 - \frac{1}{bx}$$

for the reciprocal of the denominator, 1/b. Similarly, for the square-root operation, the Newton-Raphson method first finds an approximation to a zero of the function $$f(x) = 1 - \frac{1}{bx^2}$$

for the reciprocal of the square root, $1/\sqrt{b}$.

The Newton-Raphson method starts with an initial estimate, e, of the zero to the function. Better estimates are obtained by iterating using the formula $$e_{next} = e - \frac{f(e)}{f'(e)}$$

This computation can be accomplished with only the following operations: add, subtract, multiply, and, divide-by-two (for square root, which can be accomplished with a shift). To simplify the method, the denominator, b, (for divide) is normalized to be between one half and one, and the value, b, (to find the square root of) is normalized to be between ¼ and one. Thus, the zero of the function (for both cases) is between one and two. A property of the Newton-Raphson method that may be maintained when used with these functions is that, independent of the initial estimate e, all succeeding estimates are less than the zero of the function.

Sufficient Newton-Raphson iterations are carried out to obtain the desired internal accuracy. Then a multiplication is performed. For divide, the result of the Newton-Raphson iterations is multiplied by the numerator, a, to obtain an internal result, m. For square root, the result of the Newton-Raphson iterations is multiplied by b (because b * $1/\sqrt{b}=\sqrt{b}$) to obtain an internal result m. In both cases, m is an approximation to the exact result, r. Also, the internal result, m, needs to have more accuracy than the accuracy of the final result for the method described below. Furthermore, we ensure that m is less than the exact result. The internal result, m, is also called the "result of the Newton-Raphson method".

The result of the Newton-Raphson method contains only a finite amount of accuracy. Thus, it is not exact. The desired result is the exact result rounded according to one of the following three rounding modes: (1) round towards zero (truncate), (2) round towards infinity (round up), or (2) round to nearest (if exactly half way between representable results, round to "even" to make the least-significant bit (LSB) zero).

The internal estimate, m, is rounded to produce a rounded result, t, which functions as a proposed answer. However, no matter how much extra accuracy has been achieved, the extra accuracy is finite, so the value of t may not be the same as the rounded exact result. For example, consider FIG. 1 which illustrates a segment of the real number line, with vertical lines representing values that can be represented with the finite external accuracy. Note that in the expression t+1, the "+1" represents 1 added to the least-significant bit of t (with external accuracy).

The internal value, m, is the current (best obtained) estimate. The example which appears in FIG. 1 is for rounding towards zero (down), so that m is truncated to t. However, the exact result is the value r. This means that no matter how much accuracy is obtained in computing, m, it is always possible that a representable value (in FIG. 1, the value is t+1) is between m and r. In order to produce the correct result, this situation must be evaluated and t must be replaced with t+1 if appropriate.

A computation may be performed to determine when the proposed result is different from the desired result. Let t+1 be the proposed result plus one in the least significant bit position of the result precision, and t+½ be the proposed result plus one half in the least significant bit position of the result precision.

Divide a/b, round down—Compute g=((t+1)*b)−a. If g>0, the desired answer is t, otherwise the desired answer is t+1. If g=0 the answer (t+1) is exact.

Divide a/b, round nearest—Compute g=((t+½)*b)−a. If g>0, the desired answer is t. If g<0, the desired answer is t+1. If g=0 and the least-significant bit of t is on, the desired answer is t+1. If g=0 and the least-significant bit of t is off, the desired answer is t. If (t*b)−a =0, the answer (t) is exact.

Divide a/b, round up—Compute g=(t*b)−a. If g<0, the desired answer is t+1, otherwise the desired answer is t. If g=0 the answer (t) is exact.

Square root of b, round down—Compute g=((t+1)*(t+1))−b. If g>0, the desired answer is t, otherwise the desired answer is t+1. If g=0, the answer (t+1) is exact.

Square root of b, round nearest—Compute g=((t+½)*(t+½))−b. If g>0, the desired answer is t. If g<0, the desired answer is t+1. In this case, g is never equal to zero. If the desired answer (t) squared is equal to b, the answer is exact.

Square root of b, round up—Compute g=(t*t)−b. If g<0, the desired answer is t+1, otherwise the desired answer is t. If g=0 the answer (t) is exact.

Note that for rounding up and rounding down, one computation determines both what the correct answer is and if that answer is exact. However, for the most commonly-used mode, rounding-to-nearest, two computations are required to find both what the correct answer is and if it is exact or not. (Alternatively, one computation may be used to determine if the result is a correct result, and a comparison can be used to determine if the correct result is exact.)

Hence, what is needed is a method and an apparatus for more-efficiently performing the above-described error-check and exact-check computations.

SUMMARY

One embodiment of the present invention provides a system that performs both error-check and exact-check operations for a Newton-Raphson divide or square-root computation. During operation, the system performs Newton-Raphson iterations followed by a multiply for a divide or a square-root operation to produce a result, which includes one or more additional bits of accuracy beyond a desired accuracy for the result. Next, the system rounds the result to the desired accuracy to produce a rounded result t. The system then analyzes the additional bits of accuracy to determine whether t is correct and whether t is exact.

In a variation on this embodiment, while analyzing the additional bits, if it is not possible to determine whether t is correct, the system performs an additional error-check computation to determine whether t is correct. Similarly, if it is not possible to determine whether t is exact, the system performs an additional exact-check computation to determine whether t is exact. Note that the process of analyzing the additional bits ensures that it is sometimes possible to determine either whether t is correct or whether t is exact, or both. Hence, it is not necessary to perform both an additional error-check computation and/or an additional exact-check computation.

In a variation on this embodiment, if the Newton-Raphson operation divides a by b to produce a result which is rounded down to t, if j is the value contained in the additional bits, and if there are k additional bits and $n=2^k$, then while analyzing the additional bits, if $j \leq n-1$ the system determines that t is correct and inexact. On the other hand, if $j=n-1$, the system computes $g=((t+1)*b)-a$. If $g>0$, the system determines that t is correct, and otherwise the system determines that t+1 is correct. The system determines that t+1 is exact if an only if $g=0$.

In a variation on this embodiment, if the Newton-Raphson operation divides a by b to produce a result which is rounded to the nearest representable value t, then while analyzing the additional bits, if $j<(n/2)-1$ the system determines that t is correct and inexact. On the other hand, if $j=(n/2)-1$, the system determines t is inexact, and computes $g=((t+½)*b)-a$. If $g>0$, the system determines that t is correct. If $g<0$, the system determines that t+1 is correct. If $g=0$ and the least-significant bit (LSB) of t is on, the system determines that t+1 is correct, and if $g=0$ and the LSB of t is off, the system determines that t is correct. Also, if $n/2 \leq j<n-1$, the system determines that t is correct and inexact. Finally, if $j=n-1$, the system determines that t is correct, computes $g=(t*b)-a$, and the system determines that t is exact if and only if $g=0$.

In a variation on this embodiment, if the Newton-Raphson operation divides a by b to produce a result which is rounded up to t, then while analyzing the additional bits of accuracy, if $j<n-1$ the system determines that t is correct and inexact. On the other hand, if $j=n-1$, the system computes $g=(t*b)-a$. If $g<0$, the system determines t+1 is correct, and otherwise determines that t is correct. The system determines that t is exact if and only if $g=0$.

In a variation on this embodiment, if the Newton-Raphson operation computes a square-root of a radicand b to produce a result that is rounded down to t, then while analyzing the additional bits, if $j<n-1$, the system determines that t is correct and inexact. On the other hand, if $j=n-1$, the system computes $g=((t+1)*(t+1))-b$. If $g>0$, the system determines that t is correct, and otherwise determines that t+1 is correct. The system determines that t+1 is exact if and only if $g=0$.

In a variation on this embodiment, if the Newton-Raphson operation computes a square-root of a radicand b to produce a result that is rounded to the nearest representable value t, then while analyzing the additional bits, if $j<(n/2)-1$ the system determines that t is correct and inexact. On the other hand, if $j=(n/2)-1$, the system determines that the correct answer is inexact, and computes $g=((t+½)*(t+½))-b$. If $g>0$, the system determines that t is correct. Otherwise, if $g<0$ the system determines that t+1 is correct. Also, if $n/2 \leq j<n-1$, the system determines that t is correct and inexact. Finally, if $j=n-1$, the system determines that is t is correct, computes $g=(t*t)-b$, and determines that t is exact if and only if $g=0$.

In a variation on this embodiment, if the Newton-Raphson operation computes a square-root of a radicand b to produce a result that is rounded up to t, then while analyzing the additional bits, if $j<n-1$ the system determines that t is correct and inexact. Otherwise, if $j=n-1$, the system computes $g=(t*t)-b$. If $g<0$, the system determines t+1 is correct and otherwise determines t is correct. The system determines that t is exact if and only if $g=0$.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Computer System

Figure 1:
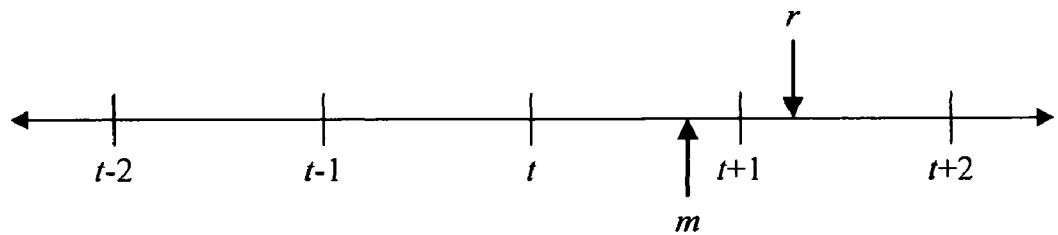
FIG. 1 illustrates a rounding operation.
Figure 2:
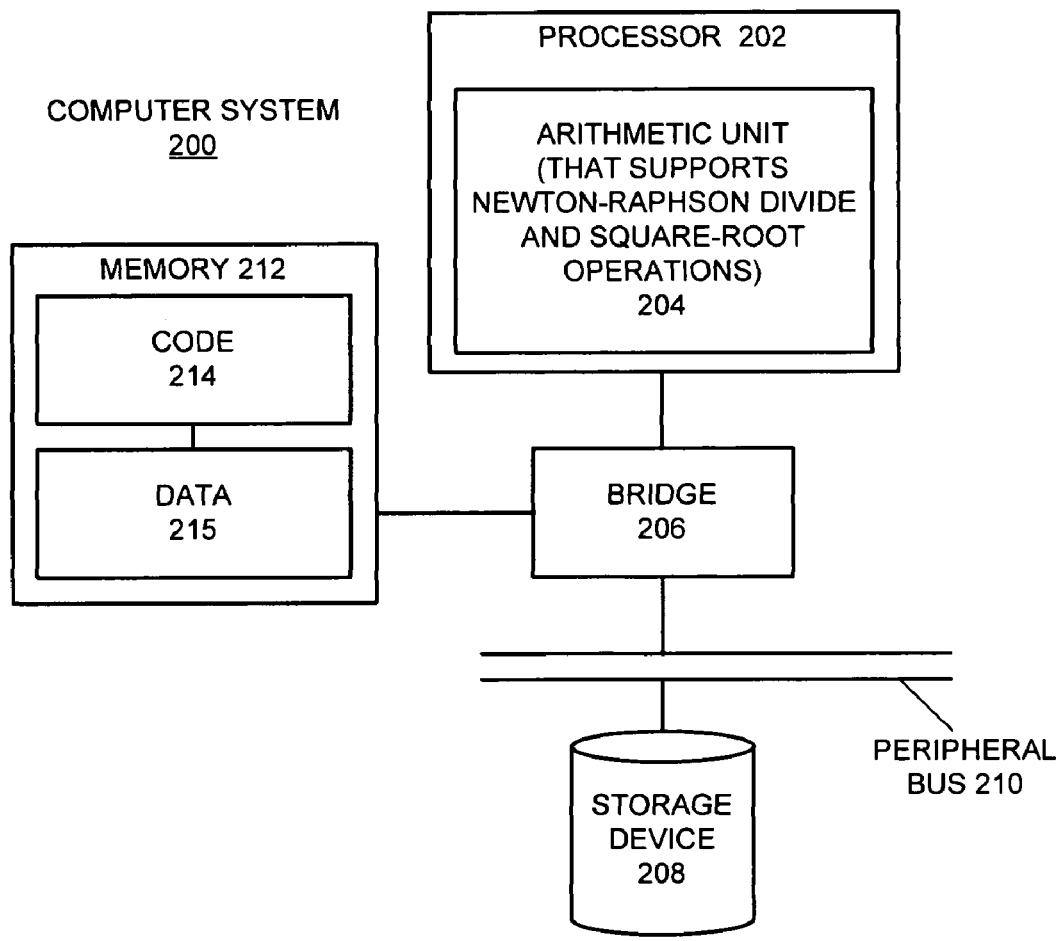
FIG. 2 illustrates a computer system in accordance with an embodiment of the present invention.

FIG. 2 illustrates a computer system 200 in accordance with an embodiment of the present invention. As illustrated in FIG. 2, computer system 200 includes processor 202, which is coupled to a memory 212 and to a peripheral bus 210 through bridge 206. Bridge 206 can generally include any type of circuitry for coupling components of computer system 200 together.

Processor 202 can include any type of processor, including, but not limited to, a microprocessor, a mainframe computer, a digital signal processor, a personal organizer, a device controller and a computational engine within an appliance. Processor 202 contains an arithmetic unit 204, which uses Booth encoding and supports Newton-Raphson divide and square-root operations.

Processor 202 communicates with storage device 208 through bridge 206 and peripheral bus 210. Storage device 208 can include any type of non-volatile storage device that can be coupled to a computer system. This includes, but is not limited to, magnetic, optical, and magneto-optical storage devices, as well as storage devices based on flash memory and/or battery-backed up memory.

Processor 202 communicates with memory 212 through bridge 206. Memory 212 can include any type of memory that can store code and data for execution by processor 202. As illustrated in FIG. 2, memory 212 contains code 214 and data 215.

Note that although the present invention is described in the context of computer system 200 illustrated in FIG. 2, the present invention can generally operate on any type of computing device with an arithmetic unit that performs divide and/or square root operations. Hence, the present invention is not limited to the computer system 200 illustrated in FIG. 2.

Error-Check and Exact-Check Computations

The present invention provides a technique where at most only one computation subsequent to obtaining the proposed result needs be performed to determine both whether the result is correct and whether the result is exact while rounding to nearest during a Newton-Raphson divide or square-root operation. No second computation or comparison is needed.

Let m be the internal value that was rounded to t, the proposed result. That is, m is the proposed result before rounding, and t is the proposed result after rounding but before any correction is made. Sufficient Newton-Raphson iterations are performed so that the final result before rounding, m, differs from the exact result, r, by less than one in the least-significant bit of the output precision. Thus, we have $m < r < m+1$, where $m+1$ is the value of m plus one in the least significant bit position of the output precision.

Figure 3A:
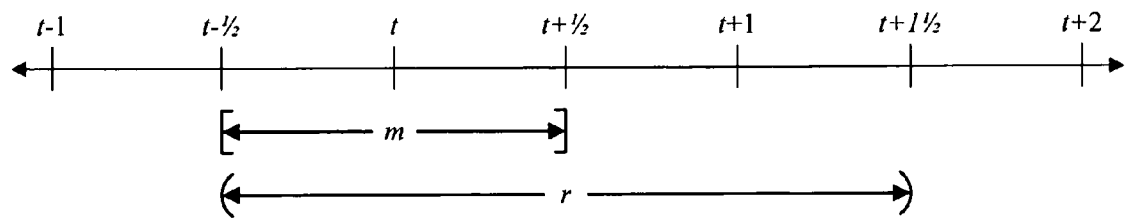
FIG. 3A illustrates the relationship between a rounded result and an exact result in accordance with an embodiment of the present invention.

Referring to FIG. 3A, because m rounded to the nearest value became t, we have $t-\frac{1}{2} \leq m \leq t+\frac{1}{2}$. Since $m < r < m+1$, it follows that $t-\frac{1}{2} < r < t+\frac{3}{2}$. In FIG. 3A, note that the symbols "[" and "]" indicate the associated interval includes the endpoints of the interval, whereas the symbols "(" and ")" indicate the associated interval does not include the endpoints of the interval.

The present invention requires at least one more bit of precision. Hence, m must differ from r by less than one half in the least significant bit of the output precision. First, we note that this usually does not necessitate any additional iterations. For example, if the initial approximation has at least 7 bits of accuracy and 53 bits of accuracy are needed for the output, then three iterations are needed. This is because each Newton-Raphson iteration doubles the number of bits of accuracy, so the number of bits of accuracy progresses from 7 to 14, 28, and finally 56. Consequently, three iterations were needed before and this also suffices for the present invention.

With one bit of additional accuracy, we have $m < r < m+\frac{1}{2}$. Again, we consider when m rounds to t, but we consider separately the two cases of the first bit of m after the output precision, the guard bit, bit v, equals 0 and equals 1.

Figure 3B:
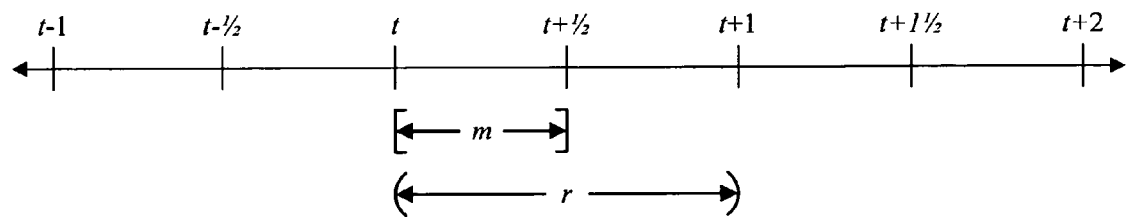
FIG. 3B illustrates the relationship between a rounded result and an exact result with an additional bit of precision in accordance with an embodiment of the present invention.

Referring to FIG. 3B, in the case where v=0 and m was not rounded up to t, $t \leq m \leq t+\frac{1}{2}$. Since $m < r < m+\frac{1}{2}$, if follows that $t < r < t+1$. In this case, we know that the correct result is inexact without any further computation. So only one computation is needed, to determine if t or t+1 is the correct result; an "exact-check" computation is not necessary.

Figure 3C:
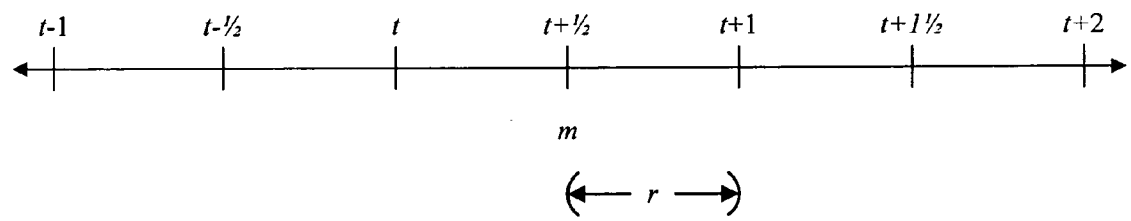
FIG. 3C illustrates the relationship between a rounded result and an exact result when an exact-check is needed in accordance with an embodiment of the present invention.

Referring to FIG. 3C, if v=0 and m was rounded up to t, then $m=t+\frac{1}{2}$. Since $m < r < m+\frac{1}{2}$, it follows that $t+\frac{1}{2} < r < t+1$. In this case, we know that the correct result is inexact without any further computation. Furthermore, we know that t+1 is the correct result. Hence, no additional "error-check" or "exact-check" computations need to be performed. Since this case rarely occurs, if v=0 we may choose to simplify the process by determining that the result is inexact and performing the error-check computation only.

Figure 3D:
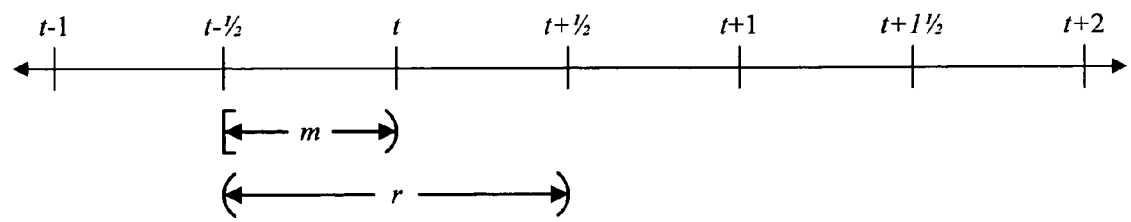
FIG. 3D illustrates the relationship between a rounded result and an exact result when an exact-check is needed in accordance with an embodiment of the present invention.

Referring to FIG. 3D, if v=1, m is always rounded up to t. Hence, $t-\frac{1}{2} \leq m < t$. Since $m < r < m+\frac{1}{2}$, it follows that $t-\frac{1}{2} < r < t+\frac{1}{2}$. In this case, we know that t is the correct result without any further computation. So only one computation is needed to determine whether t is exact; an "error-check" calculation is not necessary.

Greater Efficiency

This present invention can achieve even greater efficiency if the initial approximation used as a starting point for the Newton-Raphson divide or square-root computation has enough accuracy. To illustrate this point, consider the case where the initial approximation has at least seven and a half bits of accuracy, instead of 7. In this case, the number of bits of accuracy progresses from 7.5 to 15, 30, and finally 60. For single-precision, a 24-bit mantissa is usually needed. Hence, after 2 iterations, there are 30-24=6 bits of additional accuracy available. For double-precision, a 53-bit mantissa is usually needed. Hence, after 3 iterations, there are 60-53=7 bits of additional accuracy available. Thus, in both cases, there are at least 6 bits of additional accuracy available. With this additional accuracy, we have $m < r < m+\frac{1}{64}$.

In one embodiment of the present invention, we consider not only the guard bit, but also the five bits of m after the guard bit. If, for example, these six bits had the value of 001101, and we were rounding down, then we would have $$t+13/64 \leq m < t+14/64 \text{ and } m < r < m+1/64$$

so $$t+13/64 \leq m < r < t+15/64. \text{ Hence, } t < m < r < t+1.$$

Thus, without any additional computations, we know that t is the correct rounded down result and that it is not exact.

Each of the six cases is now examined. Assume there are k additional bits of accuracy available, where $n=2^k$. (So, if k=6, the n=64.) Let j be the value of the additional bits of accuracy starting with the guard bit. In the above example, j=13.

(1) Divide a/b round down to t—If $j \leq n-1$, the system determines that t is correct and inexact. On the other hand, if j=n-1, the system determines that t is inexact, and computes $g=((t+1)*b)-a$. If g>0, the system determines that t is correct, and otherwise the system determines that t+1 is correct. The system determines that t+1 is exact if and only if g=0.

(2) Divide a/b round down to nearest representable value t—If $j < (n/2)-1$, the system determines that t is correct and inexact. On the other hand, if j=(n/2)-1, the system determines t is inexact, and computes $g=((t+\frac{1}{2})*b)-a$. If g>0, the system determines that t is correct. If g<0, the system determines that t+1 is correct. If g=0 and the least-significant bit (LSB) of t is on, the system determines that t+1 is correct. On the other hand, if g=0 and the LSB of t is off, the system determines that t is correct. Also, if n/2≦j<n−1, the system determines that t is correct and inexact. Finally, if j=n−1, the system determines that t is correct, computes g=(t*b)−a, and determines that t is exact if and only if g=0.

(3) Divide a/b round up to t—If j<n−1 the system determines that t is correct and inexact. On the other hand, if j=n−1, the system computes g=(t*b)−a. If g<0, the system determines t+1 is correct, and otherwise determines that t is correct. The system determines that t is exact if and only if g=0.

(4) Square-root of b round down to t–If j<n−1, the system determines that t is correct and inexact. On the other hand, if j=n−1, the system determines that t is inexact, and computes g=((t+1)*(t+1))−b. If g>0, the system determines that t is correct, and otherwise determines that t+1 is correct. The system determines that t+1 is exact if and only if g=0.

(5) Square-root of b round to nearest representable value t—If j<(n/2)−1, the system determines that t is correct and inexact. On the other hand, if j=(n/2)−1, the system determines that the correct answer is inexact, and computes g=((t+½)*(t+½)−b. If g>0, the system determines that t is correct. Otherwise, if g<0 the system determines that t+1 is correct. Also, if n/2≦j<n−1, the system determines that t is correct and inexact. Finally, if j=n−1, the system determines that is t is correct, computes g=(t*t)−b, and determines that t is exact if and only if g=0.

(6) Square-root of b round down to t—If j<n−1, the system determines that t is correct and inexact. Otherwise, if j=n−1, the system computes g=(t*t)−b. If g<0, the system determines t+1 is correct and otherwise determines t is correct. The system determines that t is exact if and only if g=0.

Figure 4:
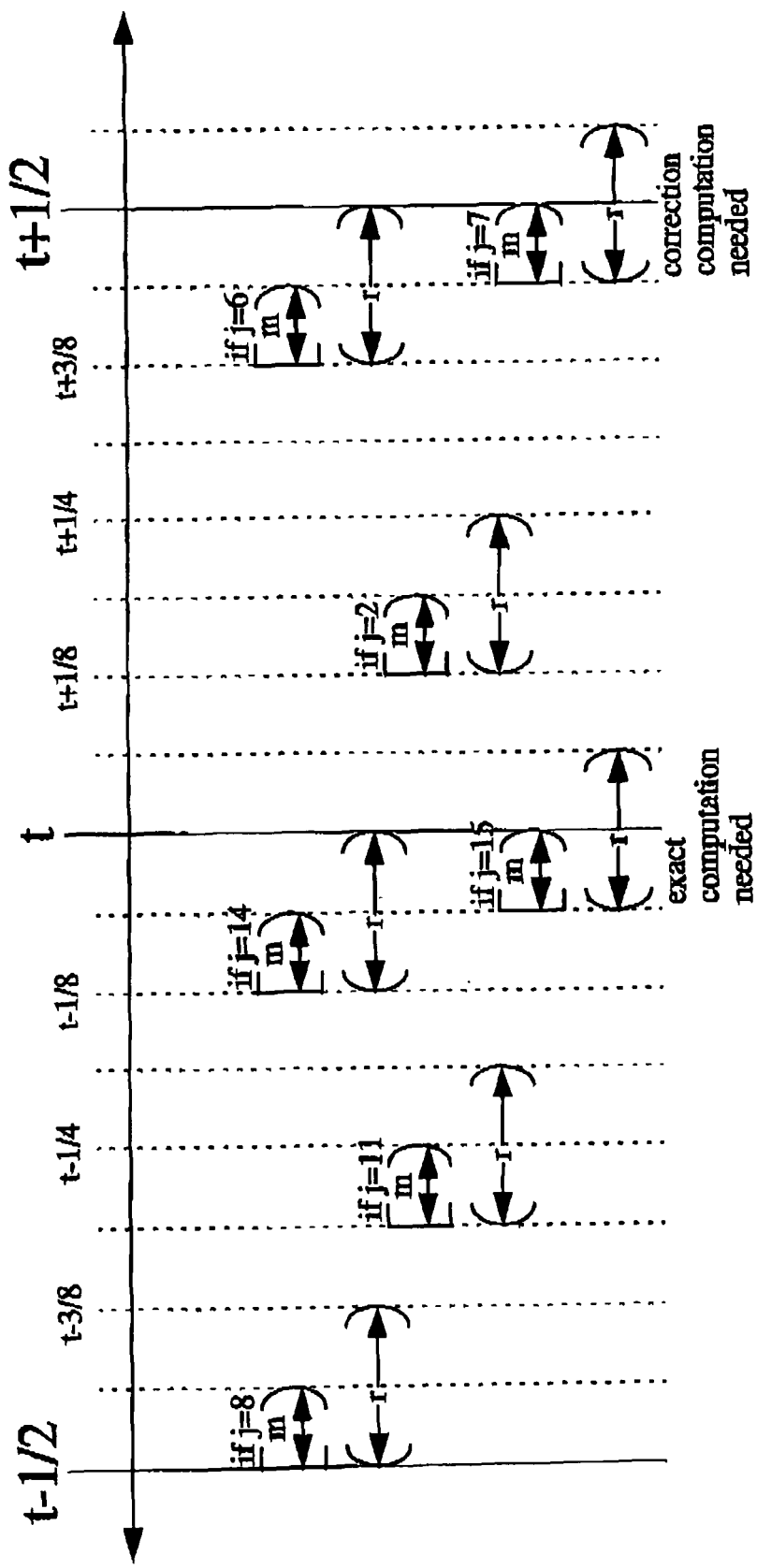
FIG. 4 presents several examples of rounding to nearest with n=16 in accordance with an embodiment of the present invention.

See FIG. 4 for several examples of rounding to nearest with n=16.

Flow Chart

Figure 5:
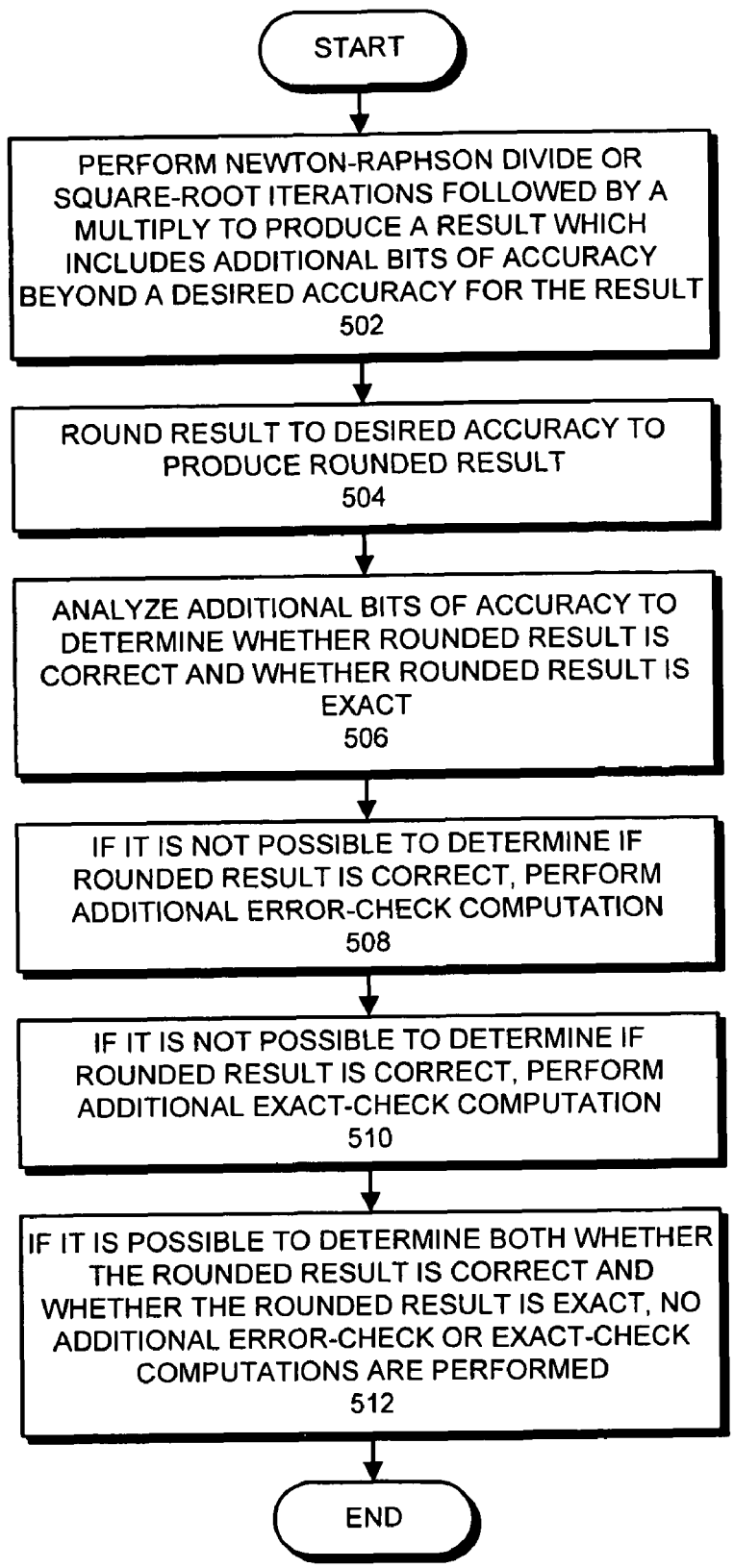
FIG. 5 presents a flow chart illustrating the process of rounding the result of a Newton-Raphson division or square-root operation and selectively performing error-check and exact-check operations in accordance with an embodiment of the present invention.

FIG. 5 presents a flow chart summarizing the process of rounding the result of a Newton-Raphson division or square-root operation in accordance with an embodiment of the present invention. During this process, the system performs Newton-Raphson divide or square-root iterations followed by a multiplication to produce an extra-precision result, which includes additional bits of accuracy beyond a desired accuracy for the result (step 502). Next, the system rounds this extra-precision result to produce a rounded result t with the desired accuracy (step 504).

Next, the system analyzes the additional bits of accuracy to determine whether the result is correct, and whether the result is exact (step 506). If it is not possible to determine if the rounded result is correct by simply analyzing the extra-precision bits, the system performs an additional error-check computation (step 508). On the other hand, if it is not possible to determine if the rounded result is exact by simply analyzing the extra-precision bits, the system performs an additional exact-check computation (step 510). Note that the above-described process of analyzing the additional bits ensures that it is possible to determine either whether t is correct or whether t is exact, or both. Hence, it is not necessary to perform both an additional error-check computation and an additional exact-check computation.

Finally, if it is possible to determine both whether the rounded result is correct and whether the rounded result is exact, no additional error-check or exact-check operations are performed (step 512). Note that this is by far the most common case if there are more than two additional bits of precision.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing both error-check and exact-check operations for a Newton-Raphson divide or square-root computation, comprising:
   in an arithmetic unit in a computing device,
      performing Newton-Raphson iterations followed by a multiply for a divide or a square-root operation to produce a result, that includes one or more additional bits of accuracy beyond a desired accuracy for the result;
      rounding the result to the desired accuracy to produce a rounded result t; and
      analyzing the additional bits of accuracy to determine whether t is correct and whether t is exact;
      wherein, if there are k additional bits and $n=2^k$, analyzing the additional bits involves using n to compare to a value j contained in the additional bits.

2. The method of claim 1,
   wherein while analyzing the additional bits, if it is not possible to determine whether t is correct, the method further comprises performing an additional error-check computation to determine whether t is correct;
   wherein while analyzing the additional bits, if it is not possible to determine whether t is exact, the method further comprises performing an additional exact-check computation to determine whether t is exact; and
   wherein the process of analyzing the additional bits ensures that it is sometimes possible to determine either whether t is correct or whether t is exact, or both, whereby it is not necessary to perform both an additional error-check computation and/or an additional exact-check computation.

3. The method of claim 2, wherein while analyzing the additional bits, if it is possible to determine both whether t is correct and whether t is exact, no additional error-check or exact-check computations are performed.

4. The method of claim 1, wherein if the Newton-Raphson operation divides a by b to produce a result which is rounded down to t, analyzing the additional bits involves:
   if j<n−1, determining that t is correct and inexact; and
   if j=n−1, computing g=((t+1)*b)−a, and if g>0, determining that t is correct, and otherwise determining that t+1 is correct, and determining that t+1 exact if and only if g=0.

5. The method of claim 1, wherein if the Newton-Raphson operation divides a by b to produce a result which is a result that is rounded to the nearest representable value t, analyzing the additional bits involves:
   if j<(n/2)−1, determining that t is correct and inexact;
   if j=(n/2)−1, determining t is inexact, and computing g=((t+½)*b)−a,
      wherein if g>0, determining that t is correct,
      wherein if g<0 determining that t+1 is correct,
      wherein if g=0 and the least-significant bit (LSB) of t is on, determining that t+1 is correct, and
      wherein if g=0 and the LSB of t is off, determining that t is correct; and if $n/2 \leq j < n-1$, determining that t is correct and inexact; and if $j=n-1$, determining that t is correct, and computing $g=(t*b)-a$, and determining that t is exact if and only if $g=0$.

6. The method of claim 1, wherein if the Newton-Raphson operation divides a by b to produce a result which is rounded up to t, analyzing the additional bits of accuracy involves:

if $j<n-1$, determining that t is correct and inexact; and if $j=n-1$, computing $g=(t*b)-a$, and if $g<0$ determining $t+1$ is correct and otherwise determining that t is correct, and determining that t is exact if and only if $g=0$.

7. The method of claim 1, wherein if the Newton-Raphson operation computes a square-root of a radicand b to produce a result that is rounded down to t, analyzing the additional bits involves:

if $j<n-1$, determining that t is correct and inexact; and if $j=n-1$, determining that t is inexact, and computing $g=((t+1)*(t+1))-b$, and if $g>0$, determining that t is correct, and otherwise determining that $t+1$ is correct, and determining that $t+1$ is exact if and only if $g=0$.

8. The method of claim 1, wherein if the Newton-Raphson operation computes a square-root of a radicand b to produce a result that is rounded to the nearest representable value t, analyzing the additional bits involves:

if $j<(n/2)-1$, determining that t is correct and inexact;

if $j=(n/2)-1$, determining that the correct answer is inexact, and computing $g=((t+½)*(t+½))-b$, wherein if $g>0$, determining that t is correct, wherein if $g<0$ determining that $t+1$ is correct; and if $n/2 \leq j < n-1$, determining that t is correct and inexact; and if $j=n-1$, determining that is t is correct, and computing $g=(t*t)-b$, and determining that t is exact if and only if $g=0$.

9. The method of claim 1, wherein if the Newton-Raphson operation computes a square-root of a radicand b to produce a result that is rounded up to t, analyzing the additional bits involves:

if $j<n-1$, determining that t is correct and inexact; and if $j=n-1$, computing $g=(t*t)-b$, and if $g<0$ determining $t+1$ is correct and otherwise determining t is correct, and determining that t is exact if and only if $g=0$.

10. An apparatus that performs both error-check and exact-check operations for a Newton-Raphson divide or square-root computation, comprising:

a processor;

memory coupled to the processor;

an arithmetic unit configured to perform Newton-Raphson iterations followed by a multiply for a divide or a square-root operation to produce a result, which includes one or more additional bits of accuracy beyond a desired accuracy for the result;

wherein the arithmetic unit is configured to round the result to the desired accuracy to produce a rounded result t;

wherein the arithmetic unit is configured to analyze the additional bits of accuracy to determine whether t is correct and whether t is exact; and wherein, if there are k additional bits and $n=2^k$, analyzing the additional bits involves using n to compare to a value j contained in the additional bits.

11. The apparatus of claim 10, wherein while analyzing the additional bits, if it is not possible to determine whether t is correct, the arithmetic unit is configured to perform an additional error-check computation to determine whether t is correct;

wherein while analyzing the additional bits, if it is not possible to determine whether t is exact, the arithmetic unit is configured to perform an additional exact-check computation to determine whether t is exact; and wherein the process of analyzing the additional bits ensures that it is sometimes possible to determine either whether t is correct or whether t is exact, or both, whereby it is not necessary to perform both an additional error-check computation and/or an additional exact-check computation.

12. The apparatus of claim 11, wherein while analyzing the additional bits, if it is possible to determine both whether t is correct and whether t is exact, the arithmetic unit is configured to perform no additional error-check or exact-check computations.

13. The apparatus of claim 10, wherein if the Newton-Raphson operation divides a by b to produce a result which is rounded down to t, while analyzing the additional bits:

if $j<n-1$, the arithmetic unit is configured to determine that t is correct and inexact; and if $j=n-1$, the arithmetic unit is configured to compute $g=((t+1)*b)-a$, and if $g>0$, to determine that t is correct, and otherwise to determine that $t+1$ is correct, and to determine that $t+1$ exact if and only if $g=0$.

14. The apparatus of claim 10, wherein if the Newton-Raphson operation divides a by b to produce a result which is a result that is rounded to the nearest representable value t, analyzing the additional bits:

if $j<(n/2)-1$, the arithmetic unit is configured to determine that t is correct and inexact;

if $j=(n/2)-1$, the arithmetic unit is configured to determine t is inexact, and to compute $g=((t+½)*b)-a$, wherein if $g>0$, the arithmetic unit is configured to determine that t is correct, wherein if $g<0$ the arithmetic unit is configured to determine that $t+1$ is correct, wherein if $g=0$ and the least-significant bit (LSB) of t is on, the arithmetic unit is configured to determine that $t+1$ is correct, and wherein if $g=0$ and the LSB of t is off, the arithmetic unit is configured to determine that t is correct; and if $n/2 \leq j < n-1$, the arithmetic unit is configured to determine that t is correct and inexact; and if $j=n-1$, the arithmetic unit is configured to determine that t is correct, and to compute $g=(t*b)-a$, and to determine that t is exact if and only if $g=0$.

15. The apparatus of claim 10, wherein if the Newton-Raphson operation divides a by b to produce a result which is rounded up to t, while analyzing the additional bits:

if $j<n-1$, the arithmetic unit is configured to determine that t is correct and inexact; and if $j=n-1$, the arithmetic unit is configured to compute $g=(t*b)-a$, and if $g<0$, to determine $t+1$ is correct, and otherwise to determine that t is correct, and determining that t is exact if and only if $g=0$.

16. The apparatus of claim 10, wherein if the Newton-Raphson operation computes a square-root of a radicand b to produce a result that is rounded down to t, while analyzing the additional bits:

if $j<n-1$, the arithmetic unit is configured to determine that t is correct and inexact; and if $j=n-1$, the arithmetic unit is configured to determine that t is inexact, and to compute $g=((t+1)*(t+1))-b$, and if $g>0$, to determine that t is correct, and otherwise to determine that $t+1$ is correct, and to determine that $t+1$ is exact if and only if $g=0$.

17. The apparatus of claim 10, wherein if the Newton-Raphson operation computes a square-root of a radicand b to produce a result that is rounded to the nearest representable value t, while analyzing the additional bits:

if $j<(n/2)-1$, the arithmetic unit is configured to determine that t is correct and inexact;

if $j=(n/2)-1$, the arithmetic unit is configured to determine that the correct answer is inexact, and to compute $g=((t+½)*(t+½)-b$, wherein if $g>0$, the arithmetic unit is configured to determine that t is correct, wherein if $g<0$ the arithmetic unit is configured to determine that t+1 is correct; and if $n/2 \leq j < n-1$, the arithmetic unit is configured to determine that t is correct and inexact; and if $j=n-1$, the arithmetic unit is configured to determine that is t is correct, and computing $g=(t*t)-b$, and determining that t is exact if and only if $g=0$.

18. The apparatus of claim 10, wherein if the Newton-Raphson operation computes a square-root of a radicand b to produce a result that is rounded up to t, while analyzing the additional bits:

if $j<n-1$, the arithmetic unit is configured to determine that t is correct and inexact; and if $j=n-1$, the arithmetic unit is configured to compute $g=(t*t)-b$, and if $g<0$, to determine t+1 is correct and otherwise to determine t is correct, and determining that t is exact if and only if $g=0$.

19. A computer that performs both error-check and exact-check operations for a Newton-Raphson divide or square-root computation, comprising:

a processor;

a memory;

an arithmetic unit within the processor configured to perform Newton-Raphson iterations followed by a multiply for a divide or a square-root operation to produce a result, which includes one or more additional bits of accuracy beyond a desired accuracy for the result;

wherein the arithmetic unit is configured to round the result to the desired accuracy to produce a rounded result t;

wherein the arithmetic unit is configured to analyze the additional bits of accuracy to determine whether t is correct and whether t is exact; and wherein while analyzing the additional bits, if there are k additional bits and $n=2^k$, the arithmetic unit is configured to use n to compare to a value j contained in the additional bits.

20. The computer system of claim 19, wherein while analyzing the additional bits, if it is not possible to determine whether t is correct, the arithmetic unit is configured to perform an additional error-check computation to determine whether t is correct;

wherein while analyzing the additional bits, if it is not possible to determine whether t is exact, the arithmetic unit is configured to perform an additional exact-check computation to determine whether t is exact; and wherein the process of analyzing the additional bits ensures that it is sometimes possible to determine either whether t is correct or whether t is exact, or both, whereby it is not necessary to perform both an additional error-check computation and/or an additional exact-check computation.

21. The computer system of claim 20, wherein while analyzing the additional bits, if it is possible to determine both whether t is correct and whether t is exact, the arithmetic unit is configured to perform no additional error-check or exact-check computations.

* * * * *

UNITED STATES PATENT AND TRADEMARK OFFICE
CERTIFICATE OF CORRECTION

| | | |
|---|---|---|
| PATENT NO. | : 7,899,859 B2 | Page 1 of 1 |
| APPLICATION NO. | : 11/314639 | |
| DATED | : March 1, 2011 | |
| INVENTOR(S) | : Allen Lyu | |

It is certified that error appears in the above-identified patent and that said Letters Patent is hereby corrected as shown below:

In claim 14 (at column 10, line 26), please insert the word --while-- at the end of the line following "value t" so that the line reads: "a result that is rounded to the nearest representable value t, while".

Signed and Sealed this
Nineteenth Day of July, 2011

David J. Kappos
*Director of the United States Patent and Trademark Office*